(12) United States Patent
Chan

(10) Patent No.: US 10,404,160 B2
(45) Date of Patent: Sep. 3, 2019

(54) AUXILIARY CONVERTER CIRCUIT AND ITS METHOD OF OPERATION

(71) Applicant: AnApp Technologies Limited, Kowloon, Hong Kong (CN)

(72) Inventor: Peter On Bon Chan, Shatin (CN)

(73) Assignee: AnApp Technologies Limited, Kowloon, Hong Kong (CN)

( * ) Notice: Subject to any disclaimer, the term of this patent is extended or adjusted under 35 U.S.C. 154(b) by 0 days.

(21) Appl. No.: 16/242,699

(22) Filed: Jan. 8, 2019

(65) Prior Publication Data

US 2019/0214901 A1    Jul. 11, 2019

Related U.S. Application Data

(60) Provisional application No. 62/615,032, filed on Jan. 9, 2018.

(51) Int. Cl.

| H02M 1/44 | (2007.01) |
|---|---|
| H02M 1/12 | (2006.01) |
| H02M 1/08 | (2006.01) |
| H02M 3/158 | (2006.01) |
| H02M 1/00 | (2006.01) |
| H02M 1/15 | (2006.01) |
| H02M 1/14 | (2006.01) |

(52) U.S. Cl.
CPC ............ *H02M 1/44* (2013.01); *H02M 1/08* (2013.01); *H02M 1/12* (2013.01); *H02M 1/14* (2013.01); *H02M 1/143* (2013.01); *H02M 1/15* (2013.01); *H02M 3/158* (2013.01); *H02M 3/1582* (2013.01); *H02M 2001/0009* (2013.01); *H02M 2001/123* (2013.01)

(58) Field of Classification Search
CPC .... H02M 2001/123; H02M 1/12; H02M 1/14; H02M 1/143; H02M 1/15
USPC ....... 323/274, 275, 277, 908; 363/39–41, 46
See application file for complete search history.

(56) References Cited

U.S. PATENT DOCUMENTS

| 5,019,952 A * | 5/1991 | Smolenski ......... H02M 1/4208 323/222 |
| 5,218,520 A * | 6/1993 | Rozman .................. H02M 1/14 363/39 |
| 9,484,797 B2 * | 11/2016 | Khlat ...................... H02M 1/15 |
| 2011/0292699 A1 * | 12/2011 | Goerke ................... H02M 1/15 363/84 |
| 2014/0098580 A1 * | 4/2014 | Liu ................... H02M 3/33507 363/45 |

(Continued)

*Primary Examiner* — Gary A Nash
(74) *Attorney, Agent, or Firm* — Leydig, Voit & Mayer

(57) ABSTRACT

An auxiliary converter circuit for regulating an input current to a main switching converter circuit. The auxiliary converter circuit has a voltage detector for determining a change in a voltage across the auxiliary converter circuit, and a current sensor for sensing an input current to the main switching converter circuit. The auxiliary converter circuit also has a current compensation circuit that includes a comparator circuit arranged to compare the sensed input current with a reference current; and a controlled current circuit. The controlled current circuit is arranged to selectively provide a positive compensation current and a negative compensation current to the input current, based on the determined voltage change and the comparison, for suppressing harmonic distortion and electromagnetic interference in the input current.

20 Claims, 12 Drawing Sheets

(56) References Cited

U.S. PATENT DOCUMENTS

2017/0302200 A1* 10/2017 Marcinkiewicz ....... H02M 1/08

* cited by examiner

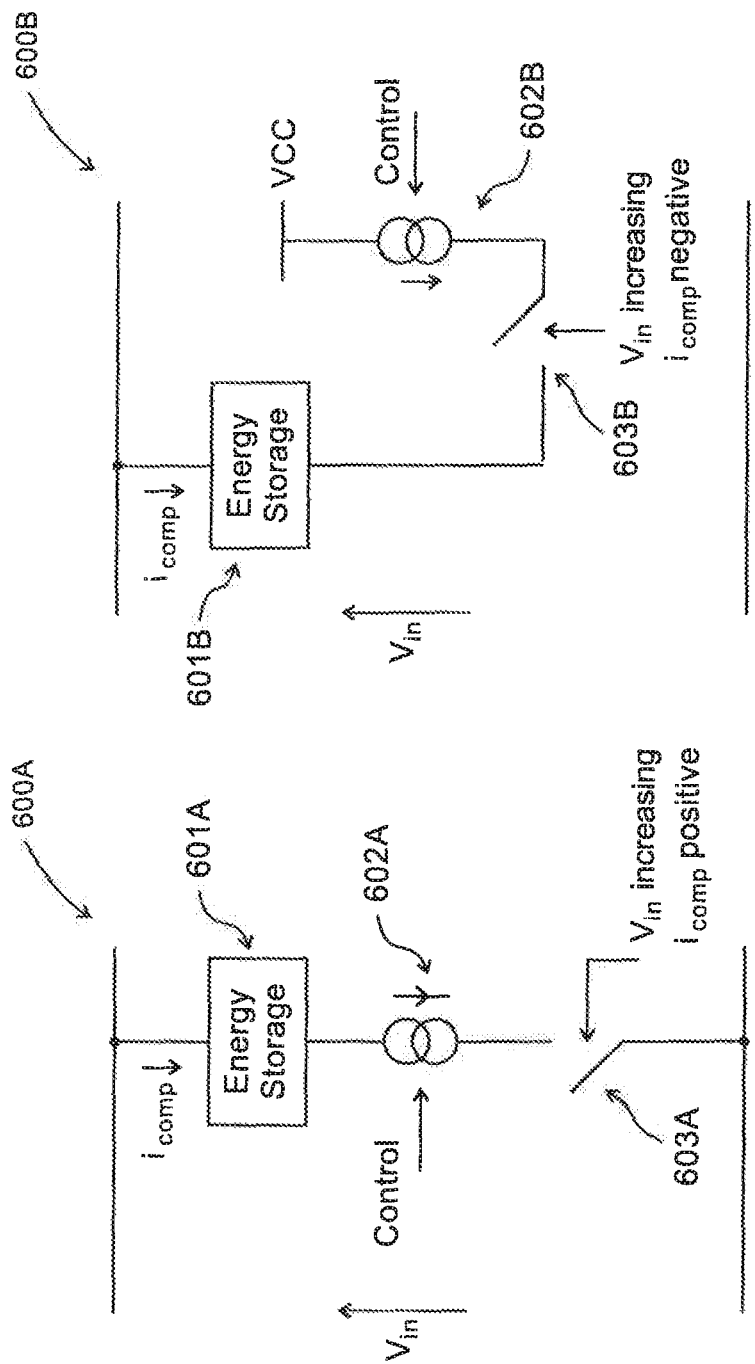

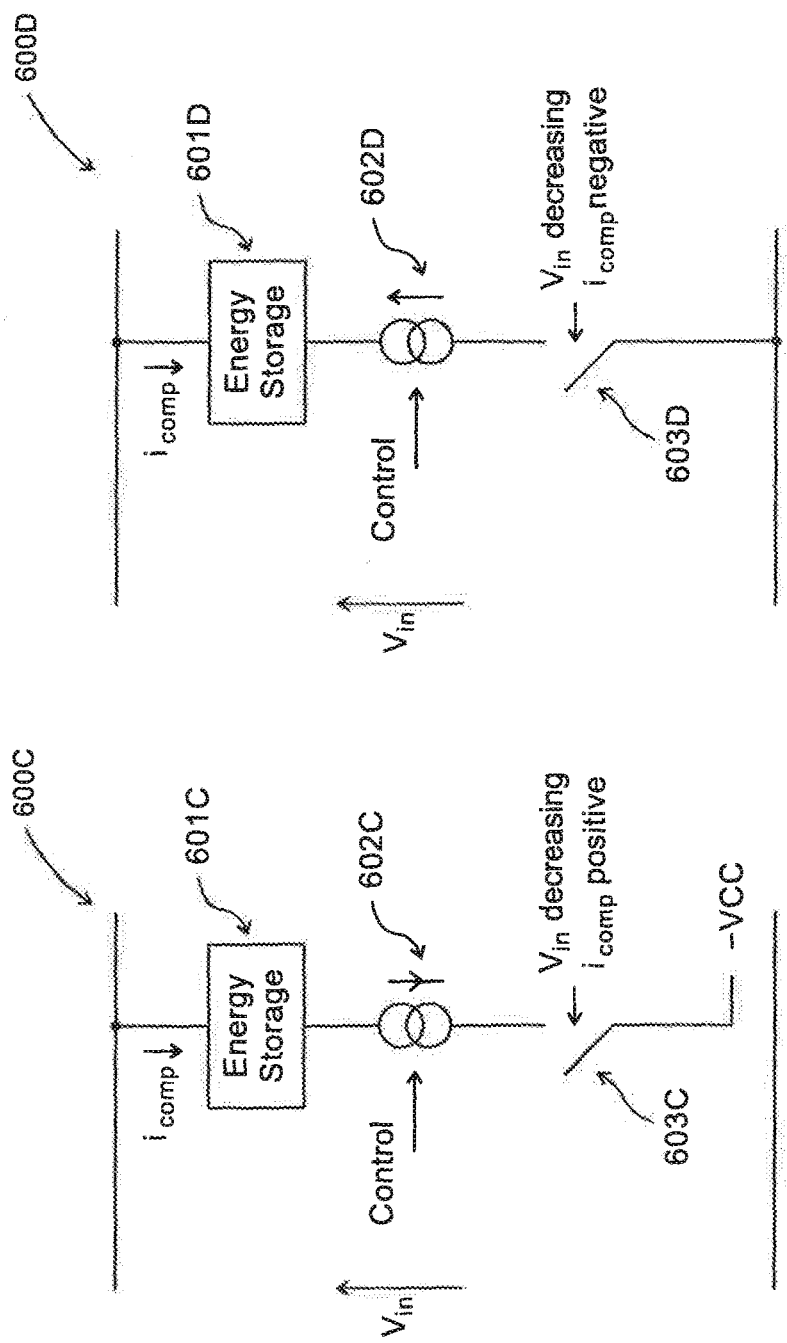

AUXILIARY CONVERTER CIRCUIT AND ITS METHOD OF OPERATION

TECHNICAL FIELD

The invention relates to an auxiliary converter circuit for regulating an input current to a main switching converter circuit, as well as to a method for regulating an input current to a main switching converter circuit.

BACKGROUND

FIG. 1A illustrates a typical AC/DC switching boost converter circuit 100 arranged between a power supply and a load. As shown in FIG. 1A, the circuit includes rectifier circuit formed by a diode bridge (with diodes D1 to D4), a boost converter circuit 102 arranged between the diode bridge and a load, an input capacitor $C_{in}$ connected across the input of the boost converter circuit 102, an output capacitor $C_o$ connected across the output of the boost converter circuit 102. In this example, the boost converter circuit 102 is formed by an inductor L, a switching device SW1, and a Zener diode D5. The diode bridge is arranged to rectify an AC input voltage and an AC input current, to provide a rectified input current to the boost converter circuit 102.

FIG. 1B shows waveforms of the supply AC voltage $v_{ac}$, the supply AC current $i_{ac}$, the rectified converter input voltage $v_{in}$, and the rectified input current $i_{in}$ in the circuit of FIG. 1A. As shown in FIG. 1B, when the capacitor $C_{in}$ in present, the rectified input current $i_{in}$ is not varying linearly with (e.g., substantially in phase with such that both increase or both decrease at the same time) the rectified converter input voltage $v_{in}$. As a result, the power factor is degraded and harmonic currents (which increase the total harmonic distortion and generate substantial electromagnetic interference) are created.

Ideally, the rectified input current $i_{in}$ should vary linearly with the rectified converter input voltage $v_{in}$ for achieving unity power factor, zero total harmonic distortion, and zero electromagnetic interference generation.

In this regard, one solution to improve the circuit in FIG. 1A is to remove the capacitor $C_{in}$ at the input of the switching boost converter circuit and apply continuous mode switching control to the switching boost converter circuit. By doing so, the input current $i_{in}$ can be controlled to have a profile with a near ideal current envelope and with high frequency current component(s) resulting from operation of the switching boost converter circuit (the near ideal current envelope and the high frequency current component(s) are superimposed).

FIG. 2 illustrates waveforms of the supply AC voltage $v_{ac}$, the rectified converter input voltage $v_{in}$, and the rectified input current $i_{in}$ in such a modified circuit (capacitor $C_{in}$ removed and continuous mode switching control applied). It can be seen that the power factor has been improved, and the total harmonic distortion and electromagnetic interference have been reduced.

Despite the improvements achieved with such modification, total harmonic distortion and electromagnetic interference for some applications, especially for switching converters with high output power, may still be quite high. Thus, there remains a need to further suppress electromagnetic interference generation and total harmonic distortion in switching converters.

SUMMARY OF THE INVENTION

In accordance with a first aspect of the invention, there is provided an auxiliary converter circuit for regulating an input current to a main switching converter circuit, comprising: a voltage detector for determining a change in a voltage across the auxiliary converter circuit; a current sensor for sensing an input current to the main switching converter circuit; and a current compensation circuit. The current compensation circuit includes a comparator circuit arranged to compare the sensed input current with a reference current, and a controlled current circuit arranged to selectively provide a positive compensation current and a negative compensation current to the input current, based on the determined voltage change and the comparison, for suppressing harmonic distortion and electromagnetic interference in the input current. The expressions "positive compensation current" and "negative compensation current" refer to current that flow in opposite direction. The "positive" and "negative" depends on the conventions or references taken in the circuit.

In a preferred embodiment of the first aspect, the input current is one from a power source to a main switching converter circuit and the auxiliary converter circuit; and the current sensor is arranged to sense such input current to the main switching converter circuit and the auxiliary converter circuit.

In one embodiment of the first aspect, the controlled current circuit is arranged to provide a positive compensation current when the change in the voltage is determined to be increasing and the sensed input current is less than the reference current so as to reduce a difference between the sensed input current and the reference current.

In one embodiment of the first aspect, the controlled current circuit is arranged to provide a positive compensation current when the change in the voltage is determined to be decreasing and the sensed input current is less than the reference current so as to reduce a difference between the sensed input current and the reference current.

In one embodiment of the first aspect, the controlled current circuit is arranged to provide a negative compensation current when the change in the voltage is determined to be increasing and the sensed input current is larger than the reference current so as to reduce a difference between the sensed input current and the reference current.

In one embodiment of the first aspect, the controlled current circuit is arranged to provide a negative compensation current when the change in the voltage is determined to be decreasing and the sensed input current is larger than the reference current so as to reduce a difference between the sensed input current and the reference current.

In one embodiment of the first aspect, the controlled current circuit is arranged to provide no compensation current when the sensed input current is equal to the reference current.

Preferably, the current compensation circuit further includes an energy storage unit. The energy storage unit is arranged to store energy when the controlled current circuit provides a negative compensation current, and supply or transfer energy when the controlled current circuit provides a positive compensation current. The energy storage unit comprises only one capacitor or multiple capacitors arranged in a capacitor network.

Preferably, the controlled current circuit further includes: a controlled current source with one or more power switching devices; and one or more switching units operably connected with the controlled current source for controlling the one or more power switching devices. The one or more switching units are respectively controlled based on the determined change in the voltage to control a current provided by the controlled current source. The switching unit may be a multiplexer. The power switching device may be a semiconductor switch, such as a transistor (e.g., MOSFET, BJT, IGBT, thyristor).

In one embodiment of the first aspect, the controlled current source is operably connected with a positive supply voltage and the one or more switching units selectively connects and disconnects the controlled current source with the positive supply voltage for selectively providing the positive compensation current and the negative compensation current.

In one embodiment of the first aspect, the controlled current source is operably connected with a negative supply voltage or ground, and the one or more switching units selectively connects and disconnects the controlled current source with the negative supply voltage or ground for selectively providing the positive compensation current and the negative compensation current.

In one embodiment of the first aspect, the controlled current source is operably connected with a positive supply voltage and a negative supply voltage or ground respectively. The one or more switching units selectively connects and disconnects the controlled current source with the positive supply voltage and the negative supply voltage or ground for selectively providing the positive compensation current and the negative compensation current.

In one embodiment of the first aspect, the current sensor comprises a resistor, a current transformer, or a Hall sensor.

In accordance with a second aspect of the invention, there is provided a circuit arranged between a power supply and a load. The circuit includes: a main switching converter circuit; and an auxiliary converter circuit of the first aspect, arranged at an input of the main switching converter circuit, for regulating an input current to the main switching converter circuit.

In a preferred embodiment of the second aspect, the input current is one from a power source to the main switching converter circuit and the auxiliary converter circuit.

In one embodiment of the second aspect, the circuit also includes a rectifier circuit arranged to provide a rectified current to the main switching converter circuit. The rectifier circuit may include a diode bridge.

Preferably, the main switching converter circuit comprises a boost converter, a buck converter, a buck-boost converter, or a flyback converter.

In accordance with a third aspect of the invention, there is provided a method for regulating an input current to a main switching converter circuit. The method includes determining, using a voltage detector, a change in a voltage across the auxiliary converter circuit; and sensing, using a current sensor, an input current to the main switching converter circuit. The method also includes comparing, using a comparator circuit, the sensed input current with a reference current; and selectively providing, using a controlled current circuit, a positive compensation current and a negative compensation current to the input current, based on the determined voltage change and the comparison, for suppressing harmonic distortion and electromagnetic interference in the input current.

In a preferred embodiment of the third aspect, the input current is one from a power source to the main switching converter circuit and an auxiliary converter circuit; and the current sensor is arranged to sense such input current to the main switching converter circuit and the auxiliary converter circuit.

In one embodiment of the third aspect, the method also includes providing, using the controlled current circuit, a positive compensation current (i) when the change in the voltage is determined to be increasing and the sensed input current is less than the reference current, or (ii) when the change in the voltage is determined to be decreasing and the sensed input current is less than the reference current, so as to reduce a difference between the sensed input current and the reference current.

In one embodiment of the third aspect, the method also includes providing, using is the controlled current circuit, a negative compensation current (i) when the change in the voltage is determined to be decreasing and the sensed input current is larger than the reference current, or (ii) when the change in the voltage is determined to be increasing and the sensed input current is larger than the reference current, so as to reduce a difference between the sensed input current and the reference current.

In one embodiment of the third aspect, the method is performed using the auxiliary converter circuit of the first aspect, which may further be arranged in the circuit of the second aspect.

BRIEF DESCRIPTION OF THE DRAWINGS

Embodiments of the invention will now be described, by way of example, with reference to the accompanying drawings in which:

FIG. 6A is a simplified circuit diagram illustrating operation of the auxiliary converter circuit in FIG. 4 when the input voltage $v_{in}$ is increasing and the compensation current $i_{comp}$ provided by the auxiliary power converter is a positive compensation current;

FIG. 6B is a simplified circuit diagram illustrating operation of the auxiliary converter circuit in FIG. 4 when the input voltage $v_{in}$ is increasing and the compensation current $i_{comp}$ provided by the auxiliary power converter is a negative compensation current;

FIG. 6C is a simplified circuit diagram illustrating operation of the auxiliary converter circuit in FIG. 4 when the input voltage $v_{in}$ is decreasing and the compensation current $i_{comp}$ provided by the auxiliary power converter is a positive compensation current;

FIG. 6D is a simplified circuit diagram illustrating operation of the auxiliary converter circuit in FIG. 4 when the input voltage $v_{in}$ is decreasing and the compensation current $i_{comp}$ provided by the auxiliary power converter is a negative compensation current;

DETAILED DESCRIPTION OF THE PREFERRED EMBODIMENT

Figure 1A:
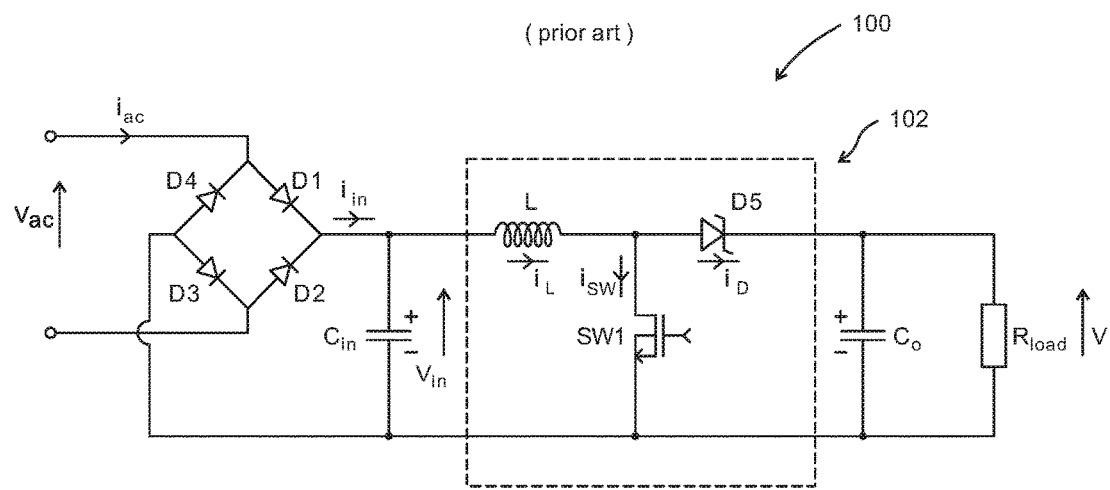
FIG. 1A is a circuit diagram of an existing AC/DC switching boost converter circuit.
Figure 1B:
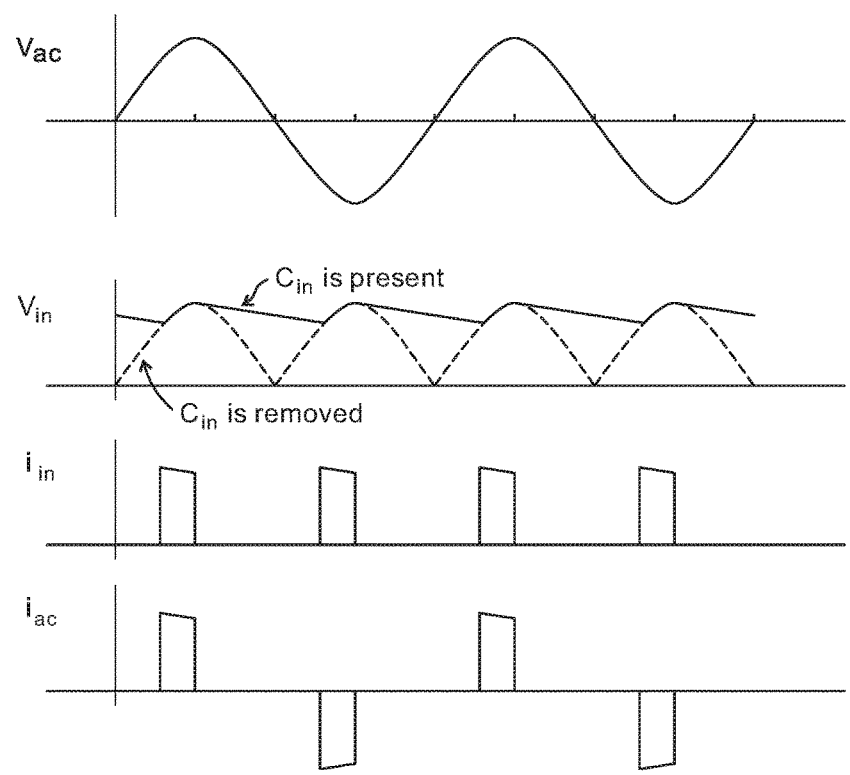
FIG. 1B is a graph showing waveforms of key voltage and current parameters in the circuit of FIG. 1A.
Figure 2:
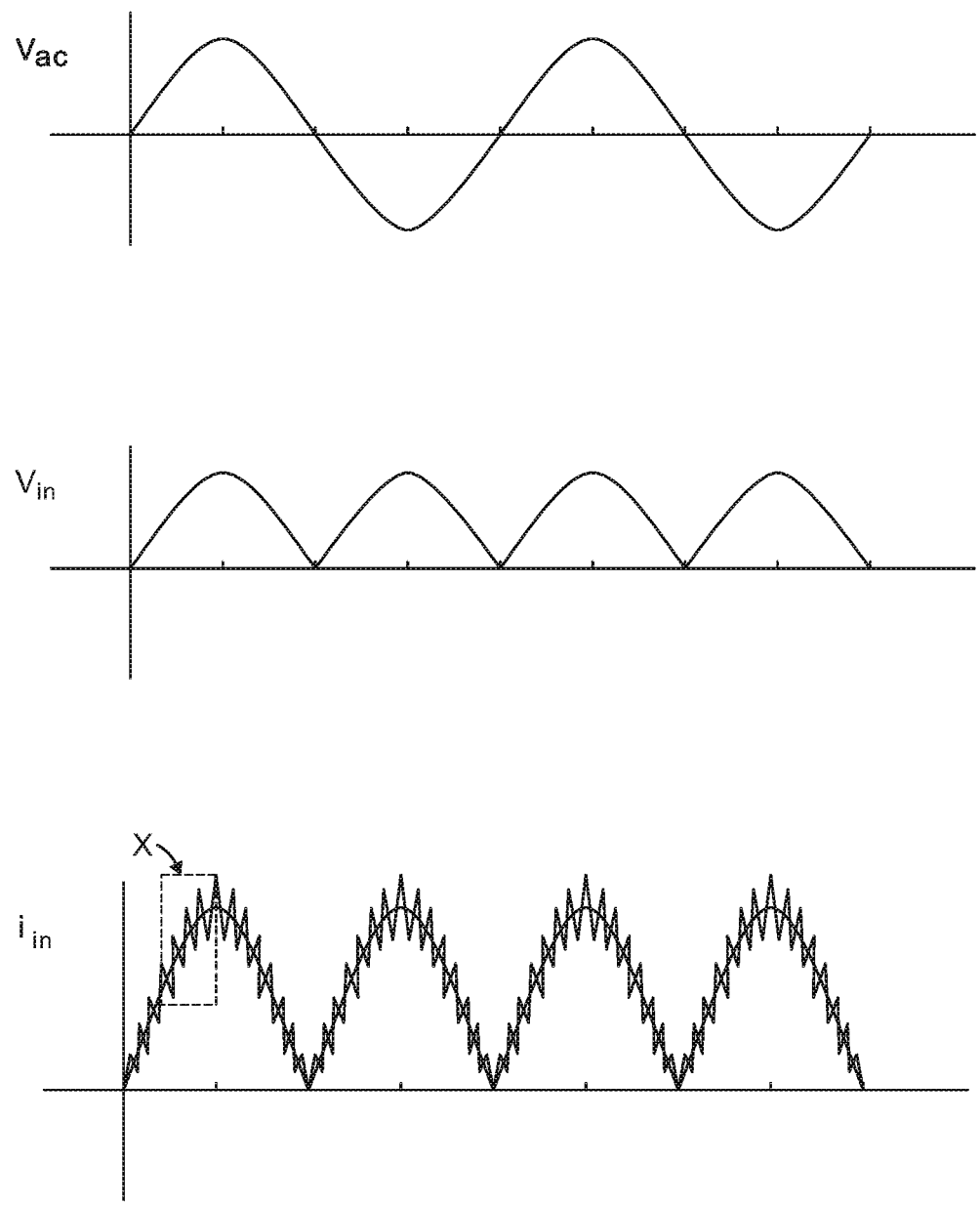
FIG. 2 is a graph showing waveforms of key voltage and current parameters for a circuit modified based on the circuit of FIG. 1A (with the capacitor at the input of the switching converter is removed and a continuous mode switching control applied)
Figure 3A:
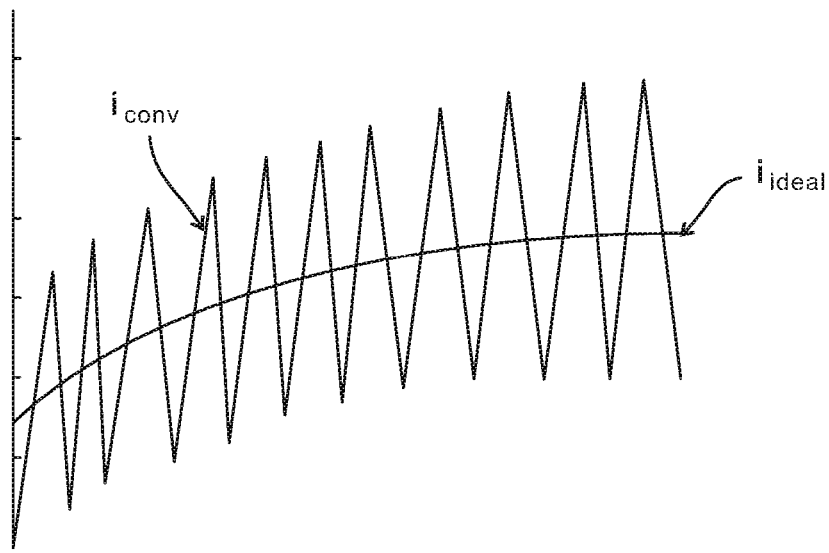
FIG. 3A is a graph showing an enlarged view of the input current waveform in the graph of FIG. 2.

Referring to FIG. 3A, there is shown an enlarged portion of the rectified input current $i_{in}$ taken from box X of FIG. 2. The rectified input current $i_{in}$ includes a boost converter input current $i_{conv}$ together with the ideal (target) input current $i_{ideal}$.

Figure 3B:
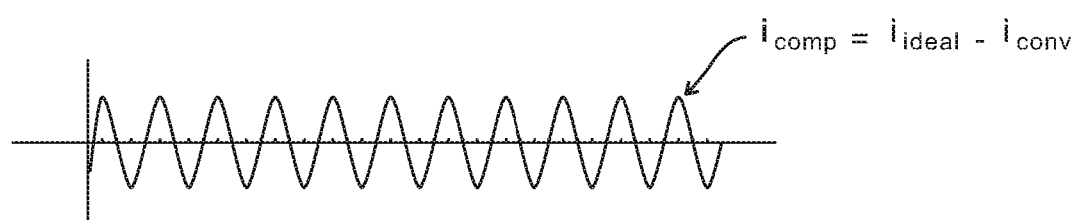
FIG. 3B is a graph showing a compensation current comp waveform determined based on the graph of FIG. 3A.

FIG. 3B shows a waveform of a compensation current $i_{comp}$, which is defined as (or equals to) the difference between the ideal (target) input current $i_{ideal}$ and the boost converter input current $i_{conv}$.

Figure 4A:
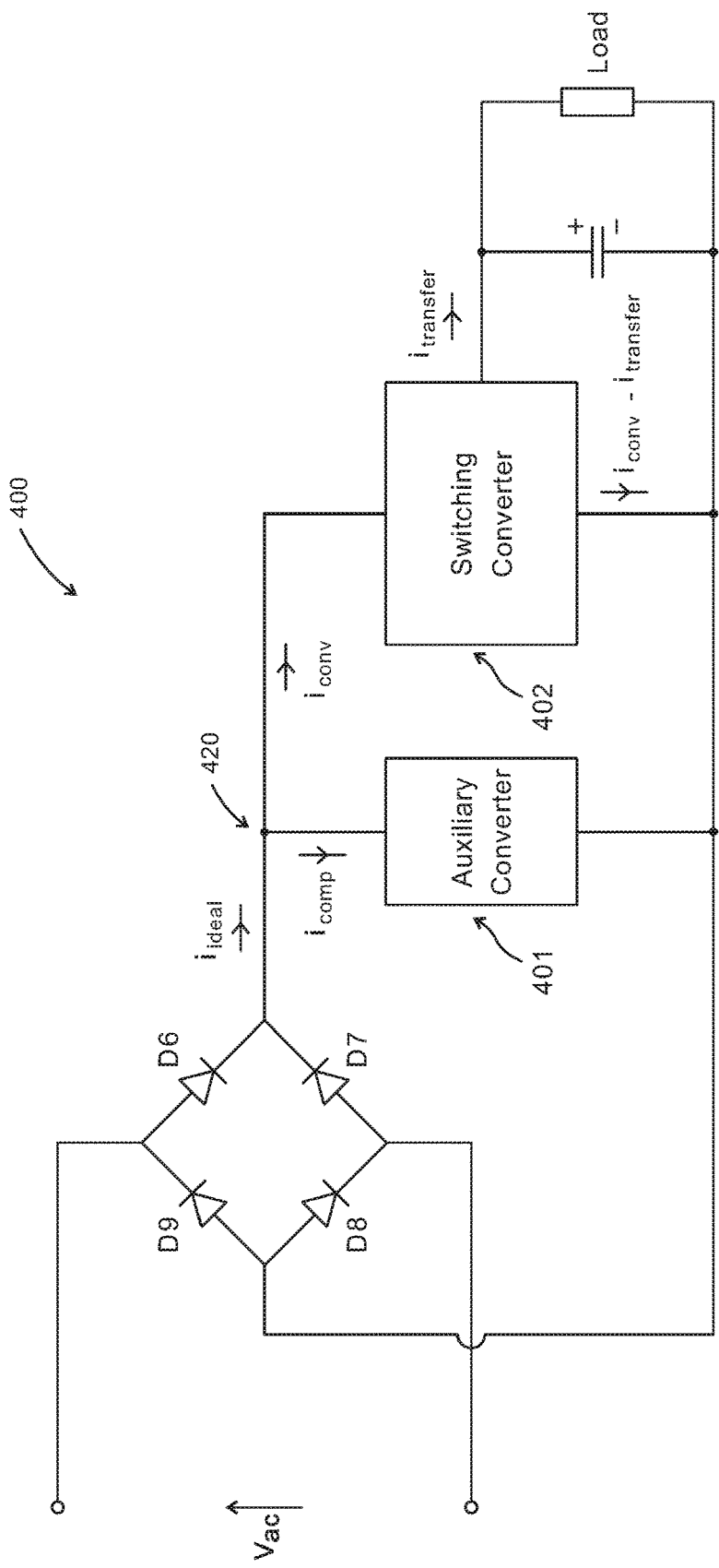
FIG. 4A is a block diagram of a circuit incorporating an auxiliary converter circuit in one embodiment of the invention.

FIG. 4A shows a circuit incorporating an auxiliary converter circuit 401 in one embodiment of the invention. The ideal (target) input current $i_{ideal}$ should, in theory, and ideally, vary linearly with (e.g., substantially in phase with such that both increase or both decrease at the same time) the rectified converter input voltage $v_{in}$.

The circuit 400 in FIG. 4A includes, generally, a rectifier circuit formed by a diode bridge (with diodes D6 to D9), a switching converter circuit 402 arranged between the rectifier circuit and the load, and an auxiliary converter circuit 401 arranged to regulate an input current from a power source to a switching converter circuit 402 and the auxiliary converter circuit 401. The auxiliary converter circuit 401 is connected across the input of the switching converter circuit 402.

When the switching converter circuit 402, e.g., a boost converter circuit, is controlled to operate under continuous mode, the current waveform of the converter input current $i_{conv}$ can be the same as that shown in FIG. 3A. In order to achieve an ideal (target) input current $i_{ideal}$ from a power source to the switching converter circuit 402 and the auxiliary converter circuit 401, the auxiliary power converter compensation current $i_{comp}$ provided by the auxiliary converter circuit 401 can be derived as (see node 420, Kirchhoff's current law):

$$i_{comp} = i_{ideal} - i_{conv} \quad (1)$$

Thus, by incorporating such the auxiliary converter circuit 401 to the switching converter circuit 402, ideal (target) input current $i_{ideal}$ that varies linearly with rectified converter input voltage $v_{in}$ can potentially be obtained to improve power factor and to suppress, or even eliminate, total harmonic distortion and electromagnetic interference.

FIG. 4A, it can be determined that when the converter input current $i_{conv}$ is less than the ideal (target) input current $i_{ideal}$, the required compensation current $i_{comp}$ is positive; and when the converter input current $i_{conv}$ is higher than the ideal (target) input current $i_{ideal}$, the required compensation current $i_{comp}$ is negative.

Figure 4B:
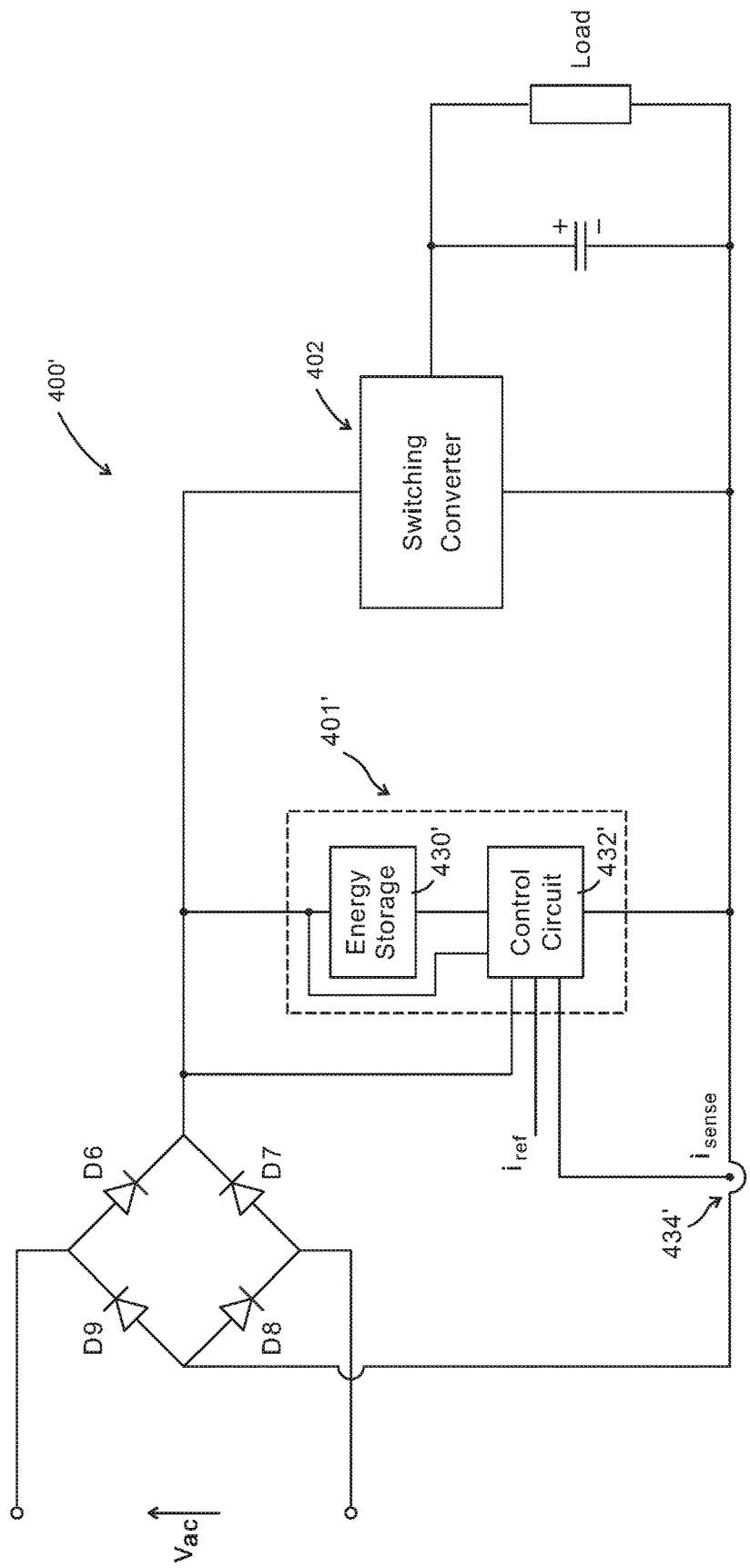
FIG. 4B is a block diagram of a circuit incorporating the auxiliary converter circuit of FIG. 4A, illustrating the basic construction of the auxiliary converter circuit of FIG. 4A in one embodiment of the invention.

FIG. 4B illustrates the basic construction of an auxiliary converter circuit 401' based on the auxiliary converter circuit 401 of FIG. 4A in one embodiment of the invention. The circuit 401' in FIG. 4B includes an energy storage unit 430 arranged to store energy when the required compensation current $i_{comp}$ is positive and transfer or supply energy when the required compensation current $i_{comp}$ is negative. The circuit 401 also includes a current sensor 434 that senses an input current $i_{in}$ to the switching converter circuit 402 and the auxiliary converter circuit 401', and a voltage detector (not shown) for determining a change in a voltage $v_{in}$ across the auxiliary converter circuit 401'. A control circuit 432 of the circuit 401 is arranged to compare the sensed input current $i_{in}$ with a reference current (e.g., the ideal (target) input current $i_{ideal}$), and selectively provides a positive compensation current and a negative compensation current based on the comparison for suppressing harmonic distortion and electromagnetic interference in the converter input current $i_{conv}$.

Figure 5A:
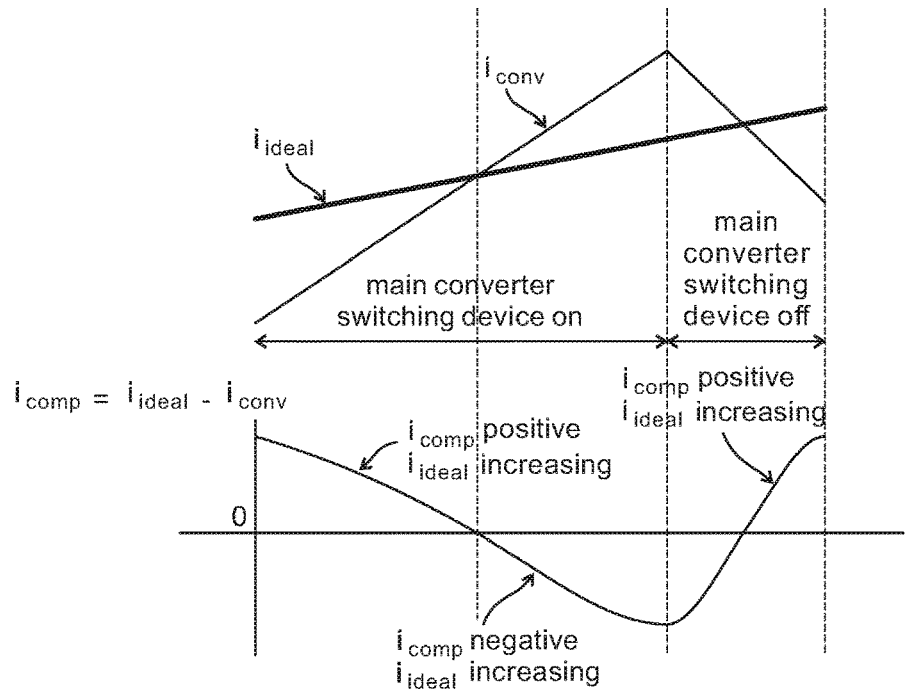
FIG. 5A is a graph showing a compensation current comp provided by the auxiliary converter circuit for a switching cycle in the circuit of FIG. 4, when the ideal input current $i_{ideal}$ is increasing and the boost converter current $i_{conv}$ is changing.
Figure 5B:
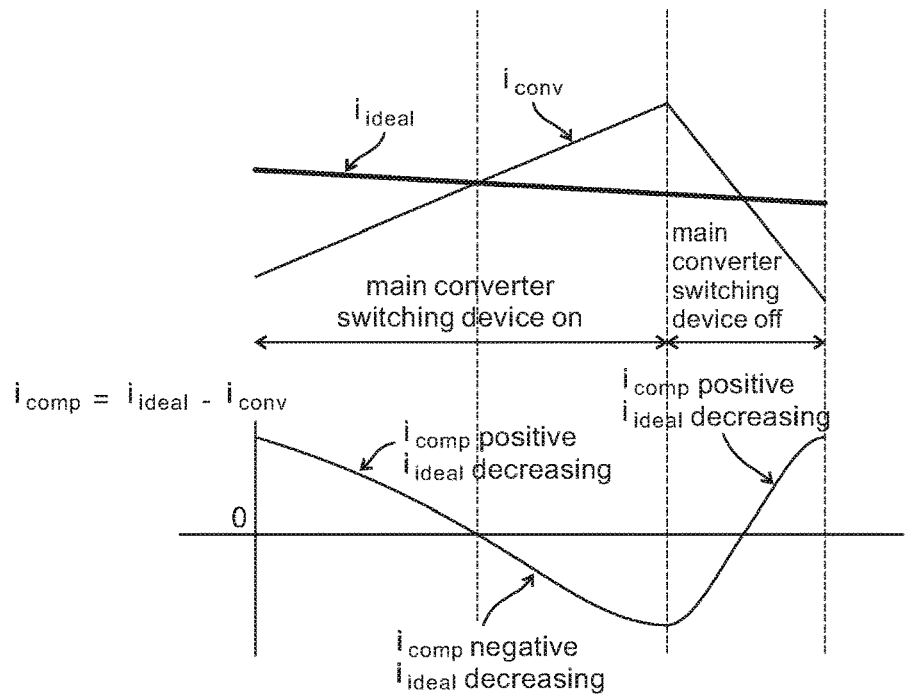
FIG. 5B is a graph showing a compensation current $i_{comp}$ provided by the auxiliary converter circuit for a switching cycle in the circuit of FIG. 4, when the ideal input current $i_{ideal}$ is decreasing and the boost converter current $i_{conv}$ is changing.

FIG. 5A shows the compensation current $i_{comp}$ provided by the auxiliary converter circuit 401 for a switching cycle in the circuit 400 of FIG. 4A, when the ideal input current $i_{ideal}$ is increasing and the converter input current $i_{conv}$ is changing (increasing or decreasing). FIG. 5B shows the compensation current $i_{comp}$ provided by the auxiliary converter circuit 401 for a switching cycle in the circuit 400 of FIG. 4A, when the ideal input current $i_{ideal}$ is decreasing and the converter input current $i_{conv}$ is changing (increasing or decreasing). It should be noted that the ideal input current $i_{ideal}$ follows the changes with the input voltage $v_{in}$, and thus an increasing ideal input current $i_{ideal}$ is resulted from an increasing input voltage $v_{in}$ whereas a decreasing ideal input current $i_{ideal}$ is resulted from a decreasing input voltage $v_{in}$. From the compensation current $i_{comp}$ waveforms of FIG. 5A and FIG. 5B, it can be observed that the compensation current $i_{comp}$ can be classified as being under four different control conditions, namely:

(1) increasing input voltage $v_{in}$ and positive compensation current $i_{comp}$ (2) increasing input voltage $v_{in}$ and negative compensation current $i_{comp}$ (3) decreasing input voltage $v_{in}$ and positive compensation current $i_{comp}$ (4) decreasing input voltage $v_{in}$ and negative compensation current $i_{comp}$ FIGS. 6A to 6D illustrate operation of the auxiliary converter circuit 401 in FIG. 4A under the four different conditions (1) to (4) described in the above paragraph. Each of the circuits 600A-600D in FIGS. 6A to 6D includes an energy storage unit 601A-601D that is used for circulating energy, i.e., storing energy when the compensation current $i_{comp}$ is positive, and transfers or supplies energy when the compensation current $i_{comp}$ is negative. The energy storage unit 601A-601D may be formed by a capacitor or a capacitor network.

In FIG. 6A, the auxiliary converter circuit 600A is operating when the input voltage $v_{in}$ is increasing (hence the desired ideal input current $i_{ideal}$ is increasing) and a positive compensation current $i_{comp}$ (with reference to the convention in FIG. 6A) is required. The auxiliary converter circuit 600A includes an energy storage unit 601A, a controlled current source 602A, and a switch 603A arranged in series, connected across the input of the switching converter circuit 402. In this embodiment, the energy storage unit 601A is arranged to store energy. Switch 603A is closed when the input voltage $v_{in}$ is increasing and a positive compensation current $i_{comp}$ is required. The controlled current source 602A provides the desired magnitude of positive compensation current $i_{comp}$ when the input voltage $v_{in}$ is increasing.

In FIG. 6B, the auxiliary converter circuit 600B is operating when the input voltage $v_{in}$ is increasing (hence the desired ideal input current $i_{ideal}$ is increasing) and a negative compensation current $i_{comp}$ (with reference to the convention in FIG. 6B) is required. The auxiliary converter circuit 600B includes an energy storage unit 601B, a controlled current source 602B, and a switch 603B arranged in series. The tail end of controlled current source 602B is connected to a positive supply voltage $V_{cc}$. In this embodiment, the energy storage unit 601B is arranged to transfer or supply energy. Switch 603B is closed when the input voltage $v_{in}$ is increasing and a negative compensation current $i_{comp}$ is required. The controlled current source 602B provides the desired magnitude of negative compensation current $i_{comp}$ when the input voltage $v_{in}$ is increasing. In this embodiment, as the input voltage $v_{in}$ increases, the voltage at the energy storage unit 601B is lower than the input voltage $v_{in}$ and hence the energy storage unit 601B, on its own, cannot provide the negative compensation current $i_{comp}$. Instead, the negative compensation current is provided by (and made possible by adding) the positive supply voltage $V_{cc}$ connected to the tail end of controlled current source 602B.

In FIG. 6C, the auxiliary converter circuit 600C is operating when the input voltage $v_{in}$ is decreasing (hence the desired ideal input current $i_{ideal}$ is decreasing) and a positive compensation current $i_{comp}$ (with reference to the convention in FIG. 6C) is required. The auxiliary converter circuit 600C includes an energy storage unit 601C, a controlled current source 602C, and a switch 603C arranged in series. The tail end of controlled current source 602C is connected to a negative supply voltage $-V_{cc}$. In this embodiment, the energy storage unit 601C is arranged to store energy. Switch 603C is closed when the input voltage $v_{in}$ is decreasing and a positive compensation current $i_{comp}$ is required. The controlled current source 602C provides the desired magnitude of positive compensation current $i_{comp}$ when the input voltage $v_{in}$ is increasing. In this embodiment, as the input voltage $v_{in}$ decreases, the voltage at the energy storage unit 601C is higher than the input voltage $v_{in}$ and hence the energy storage unit 601C cannot provide, on its own, the positive compensation current $i_{comp}$. Instead, the positive compensation current is provided by (and made possible by adding) the negative supply voltage $-V_{cc}$ connected to the tail end of controlled current source 602C.

In FIG. 6D, the auxiliary converter circuit 600D is operating when the input voltage $v_{in}$ is decreasing (hence the desired ideal input current $i_{ideal}$ is decreasing) and a negative compensation current $i_{comp}$ (with reference to the convention in FIG. 6D) is required. The auxiliary converter circuit 600D includes an energy storage unit 601D, a controlled current source 602D, and a switch 603D arranged in series, connected across the input of the switching converter circuit 402. In this embodiment, the energy storage unit 601D is arranged to supply or transfer energy. Switch 603D is closed when the input voltage $v_{in}$ is decreasing and a negative compensation current $i_{comp}$ is required. The controlled current source 602D provides the desired magnitude of negative compensation current $i_{comp}$ when the input voltage $v_{in}$ is decreasing.

Figure 7A:
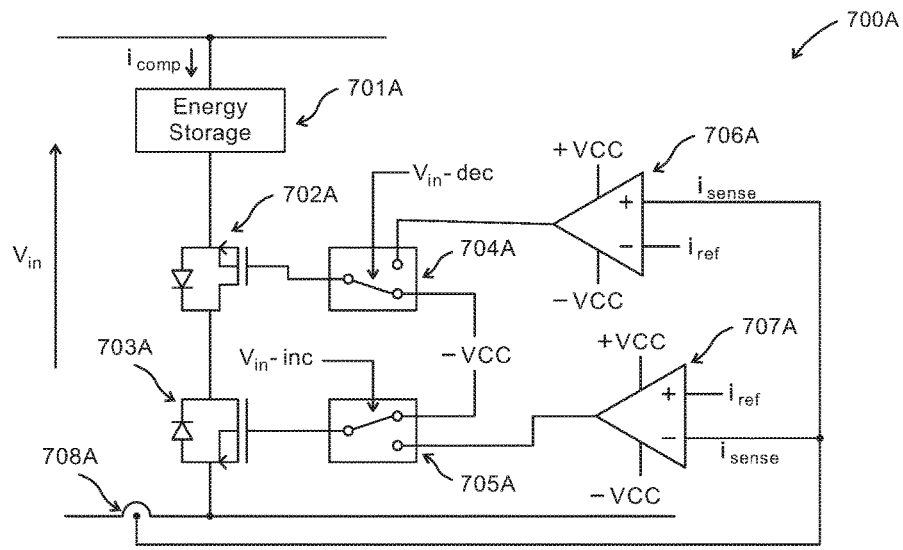
FIG. 7A is a circuit diagram of an implementation of the auxiliary converter circuit of FIGS. 6A and 6D in one embodiment of the invention.

FIG. 7A shows a circuit 700A implementing of the auxiliary converter circuit 600A of FIG. 6A and the circuit 600D of FIG. 6D in one embodiment of the invention. The circuit 700A includes an energy storage unit 701A (e.g., formed by a capacitor or capacitor network) and two N-type MOSFETs 702A, 703A (each having a body diode), connected in series, across the input of the switching converter circuit (not shown). The circuit 700A also includes a current sensor 708A for sensing an input current to the switching converter circuit (not shown) and the circuit 700A. The current sensor 708A may include a resistor, a current transformer, or a Hall sensor. A multiplexer 704A is connected to a gate terminal of the MOSFET 702A to selectively control operation of the MOSFET 702A. A multiplexer 705A is connected to a gate terminal of the MOSFET 703A to selectively control operation of the MOSFET 703A. A comparator 706A is connected between the current sensor 708A and the multiplexer 704A. A comparator 707A is connected between the current sensor 708A and the multiplexer 705A. Each comparator 706A, 707A is arranged to compare the sensed input current $i_{in}$ from a power source with a reference current $i_{ref}$, e.g., the ideal input current $i_{ideal}$, to provide an output to the corresponding multiplexer 704A, 705A. The multiplexer 704A is selectively controlled to connect with a negative supply voltage $-V_{cc}$ and the output of the comparator 706A, depending on whether the input voltage $v_{in}$ is increasing or decreasing. The multiplexer 705A is selectively controlled to connect with a negative supply voltage $-V_{cc}$ and the output of the comparator 707A, depending on whether the input voltage $v_{in}$ is increasing or decreasing.

In the case of operation of the circuit 700A based on the operation of FIG. 6A, when the input voltage $v_{in}$ is increasing, the multiplexer 704A turns off the N-type MOSFET 702A by connecting its control terminal to the negative supply voltage $-V_{cc}$. In this case, the compensation current $i_{comp}$ is positive and it flows through the body diode of N-type MOSFET 702A. The source terminal of N-type MOSFET 702A can be considered as being disconnected from energy storage unit 701A. The multiplexer 705A connects the output of the comparator 707A (i.e., the error signal derived from the difference between the reference (or ideal) input current $i_{ref}$ and the sensed input current $i_{sense}$ obtained from current sensor 708A) with the control terminal of the N-type MOSFET 703A when the input voltage $v_{in}$ is increasing. As a result, positive compensation current control is achieved by controlling N-type MOSFET 703A using the error signal derived from the comparison.

In the case of operation of the circuit 700A based on the operation of FIG. 6D, when the input voltage $v_{in}$ is decreasing, the multiplexer 705A turns off N-type MOSFET 703A by connecting its control terminal to the negative supply voltage $-V_{cc}$. In this case, the compensation current $i_{comp}$ is negative and it flows through the body diode of N-type MOSFET 703A. Hence, the source of N-type MOSFET 703A can be considered as disconnected from the return node of the input voltage $v_{in}$. The multiplexer 704A connects the output of the comparator 706A (i.e., the error signal derived from the difference of the reference (or ideal) input current $i_{ref}$ and the sensed input current $i_{sense}$ obtained from current sensor 708A) with the control terminal of N-type MOSFET 702A when the input voltage $v_{in}$ is decreasing. As a result, negative compensation current control is achieved by controlling N-type MOSFET 702A using the error signal derived from the comparison.

Figure 7B:
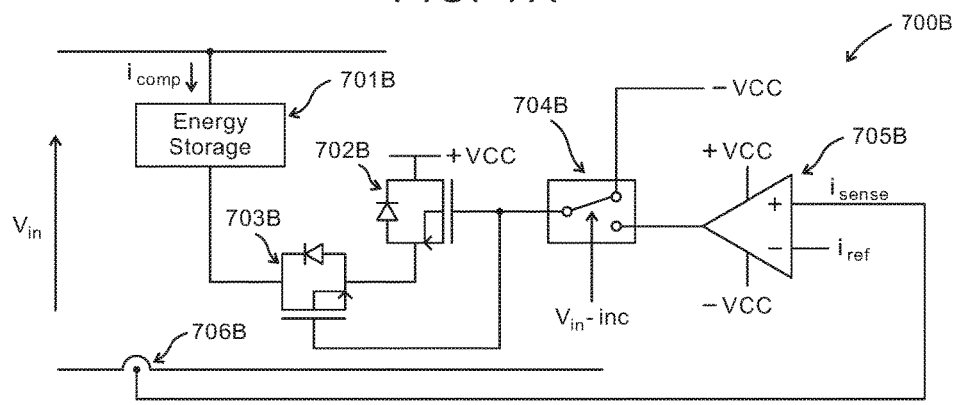
FIG. 7B is a circuit diagram of an implementation of the auxiliary converter circuit for FIG. 6B in one embodiment of the invention.

FIG. 7B shows a circuit 700B implementing of the auxiliary converter circuit 600B of FIG. 6B in one embodiment of the invention. The circuit 700B includes an energy storage unit 701B (e.g., formed by a capacitor or capacitor network) and two N-type MOSFETs 702B, 703B (each having a body diode), a multiplexer 704B, and a comparator 705B. The circuit 700B also includes a current sensor 706B for sensing an input current to the switching converter circuit (not shown) and the circuit 700B. The current sensor 706B may include a resistor, a current transformer, or a Hall sensor. The multiplexer 704B is connected, on one side, to both gate terminals of the MOSFETS 702B, 703B, and connected, on the other side, selectively to a negative supply voltage $-V_{cc}$ and an output of the comparator 705B (depending on whether the input voltage $v_{in}$ is increasing or decreasing). The comparator 705B is connected between the current sensor 706B and the multiplexer 704B, for comparing the sensed input current $i_{in}$ with a reference current $i_{ref}$, e.g., the ideal input current $i_{ideal}$ to provide an output to the multiplexer 704B.

In the case of operation of the circuit 700B based on the operation of FIG. 6B, when the input voltage $v_{in}$ is decreasing, the multiplexer 704B turns off both MOSFETs 702B, 703B by connecting the gate terminals of N-type MOSFETs 702B, 703B to the negative supply voltage $-V_{cc}$. This effectively disconnects the path from drain terminal of N-type MOSFET 703B to the positive supply voltage $+V_{cc}$ (this positive supply voltage makes negative compensation current possible when the input voltage $v_{in}$ is increasing). Hence the lower terminal (the terminal not connecting directly to the positive side of the input voltage $v_{in}$) of the energy storage unit 701B becomes effectively open circuit. When the input voltage $v_{in}$ is increasing and the reference input current $i_{ref}$ is smaller than the sensed input current $i_{sense}$ (which means that the desired compensation current $i_{comp}$ is negative), multiplexer 704B connects the gate terminals of N-type MOSFETs 702B, 703B to the output of comparator 705B such that negative compensation current can be achieved by controlling the gate voltage of N-type MOSFETs 702B, 703B. In this embodiment, current control is achieved by using the error signal derived by comparator 705B based on the difference of the sensed input current $i_{sense}$ sensed by the current sensor 706B and the reference input current $i_{ref}$.

Figure 7C:
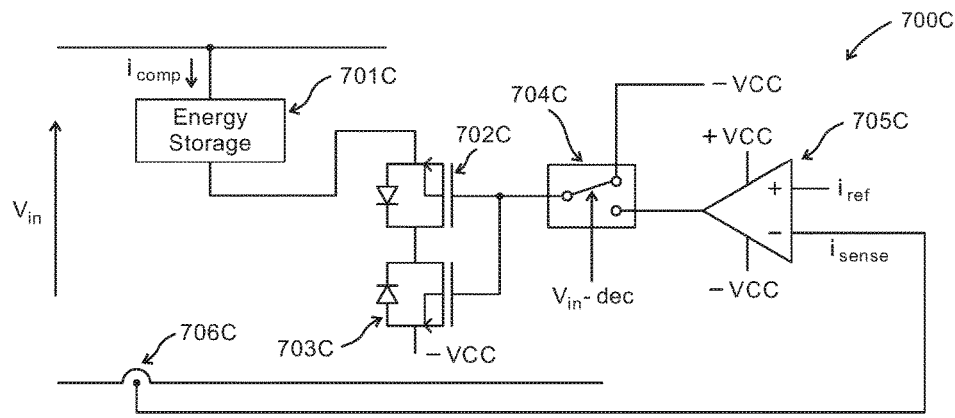
FIG. 7C is a circuit diagram of an implementation of the auxiliary converter circuit for FIG. 6C in one embodiment of the invention.

FIG. 7C shows a circuit 700C implementing of the auxiliary converter circuit 600C of FIG. 6C in one embodiment of the invention. The circuit 700C includes an energy storage unit 701C (e.g., formed by a capacitor or capacitor network) and two N-type MOSFETs 702C, 703C (each having a body diode), a multiplexer 704C, and a comparator 705C. The circuit 700C also includes a current sensor 706C for sensing an input current to the switching converter circuit (not shown) and the circuit 700C. The current sensor 706C may include a resistor, a current transformer, or a Hall sensor. The multiplexer 704C is connected, on one side, to both gate terminals of the MOSFETs 702C, 703C, and connected, on the other side, selectively to a negative supply voltage $-V_{cc}$ and an output of the comparator 705C (depending on whether the input voltage $v_{in}$ is increasing or decreasing). The comparator 705C, connected between the current sensor 706C and the multiplexer 704C, is for comparing the sensed input current $i_{in}$ with a reference current $i_{ref}$, e.g., the ideal input current $i_{ideal}$ to provide an output to the multiplexer 704B.

In the case of operation of the circuit 700C based on the operation of FIG. 6C, when the input voltage $v_{in}$ is increasing, the multiplexer 704C turns off both N-type MOSFETs 702C, 703C by connecting the gate terminals of N-type MOSFETs 702C, 703C to the negative supply voltage $-V_{cc}$. This effectively disconnects the path from the source terminal of N-type MOSFET 702C to the negative supply voltage $-V_{cc}$. Hence, the lower terminal (the terminal not connecting directly to the positive side of the input voltage $v_{in}$) of the storage block 701C is effectively open circuit. When the input voltage $v_{in}$ is decreasing and the reference current $i_{ref}$ is smaller than sensed input current $i_{sense}$ (which means that the desired compensation current $i_{comp}$ is positive), the multiplexer 704C connects the gate terminals of N-type MOSFETs 702C, 703C to the output of comparator 705C such that positive compensation current can be achieved by controlling the gate voltage of N-type MOSFETs 702C, 703C. As the source terminal of N-type MOSFET 703C is connected to the negative supply voltage $-V_{cc}$ instead of the return of the input voltage $v_{in}$, positive compensation current is made possible when the input voltage $v_{in}$ is decreasing. In this embodiment, current control is achieved by using the error signal derived by comparator 705C based on the difference of the sensed input current $i_{sense}$ sensed by the current sensor 706C and the reference input current $i_{ref}$.

Figure 8:
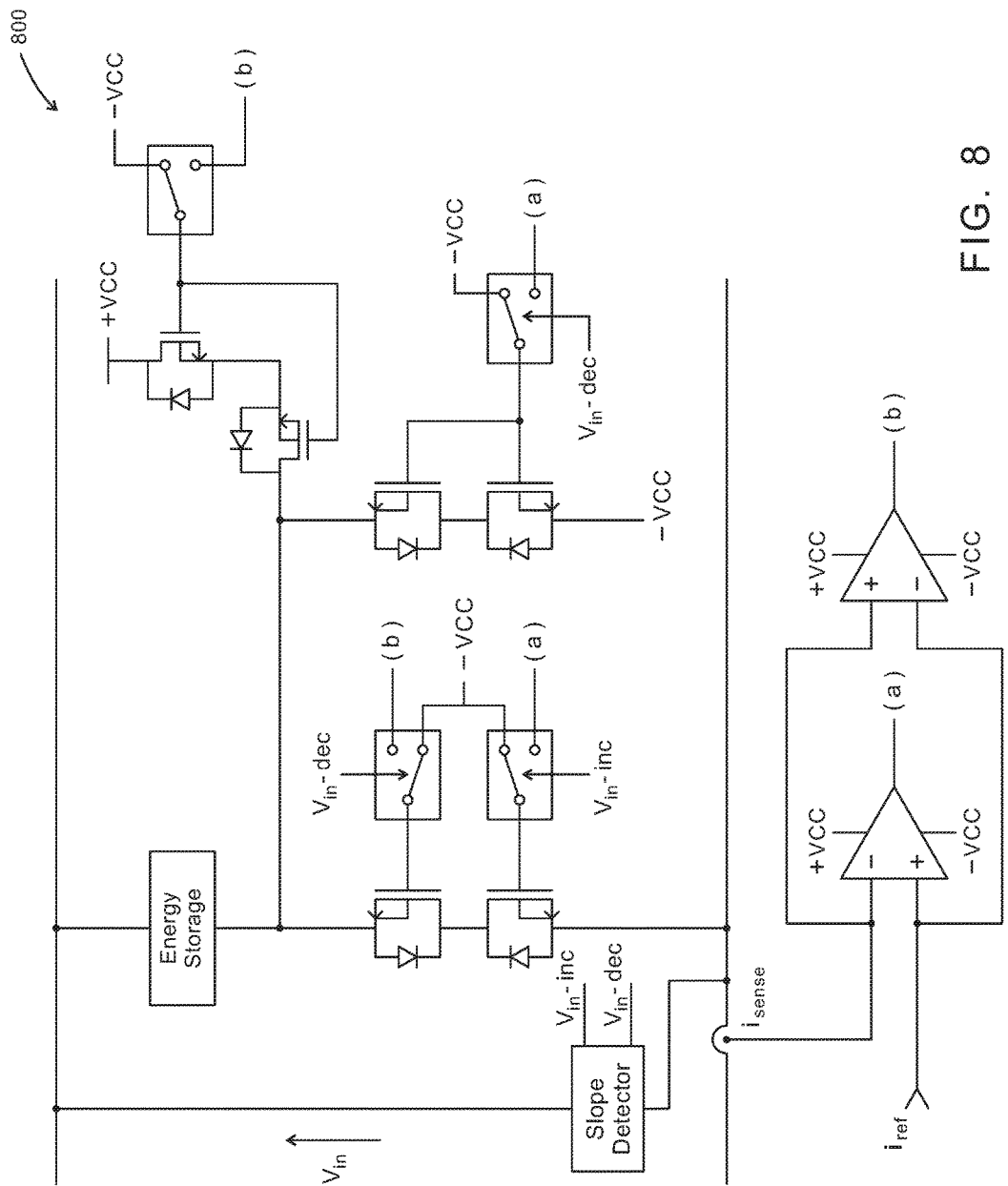
FIG. 8 is a circuit diagram of an auxiliary converter circuit formed based on the combination of the circuits in FIGS. 7A to 7C in one embodiment of the invention.

FIG. 8 shows an auxiliary power converter circuit 800 modified based on the circuits 700A-700C in FIGS. 7A to 7C to perform the functions of the circuits 700A-700C of FIGS. 7A to 7C (with redundant circuit components removed, input current detection circuit modified, and voltage increase/decrease detector added). In this embodiment, a slope detector, e.g., a voltage detector, is arranged to determine whether the input voltage $v_{in}$ is increasing or decreasing, for controlling operation of the circuit 800.

Figure 9:
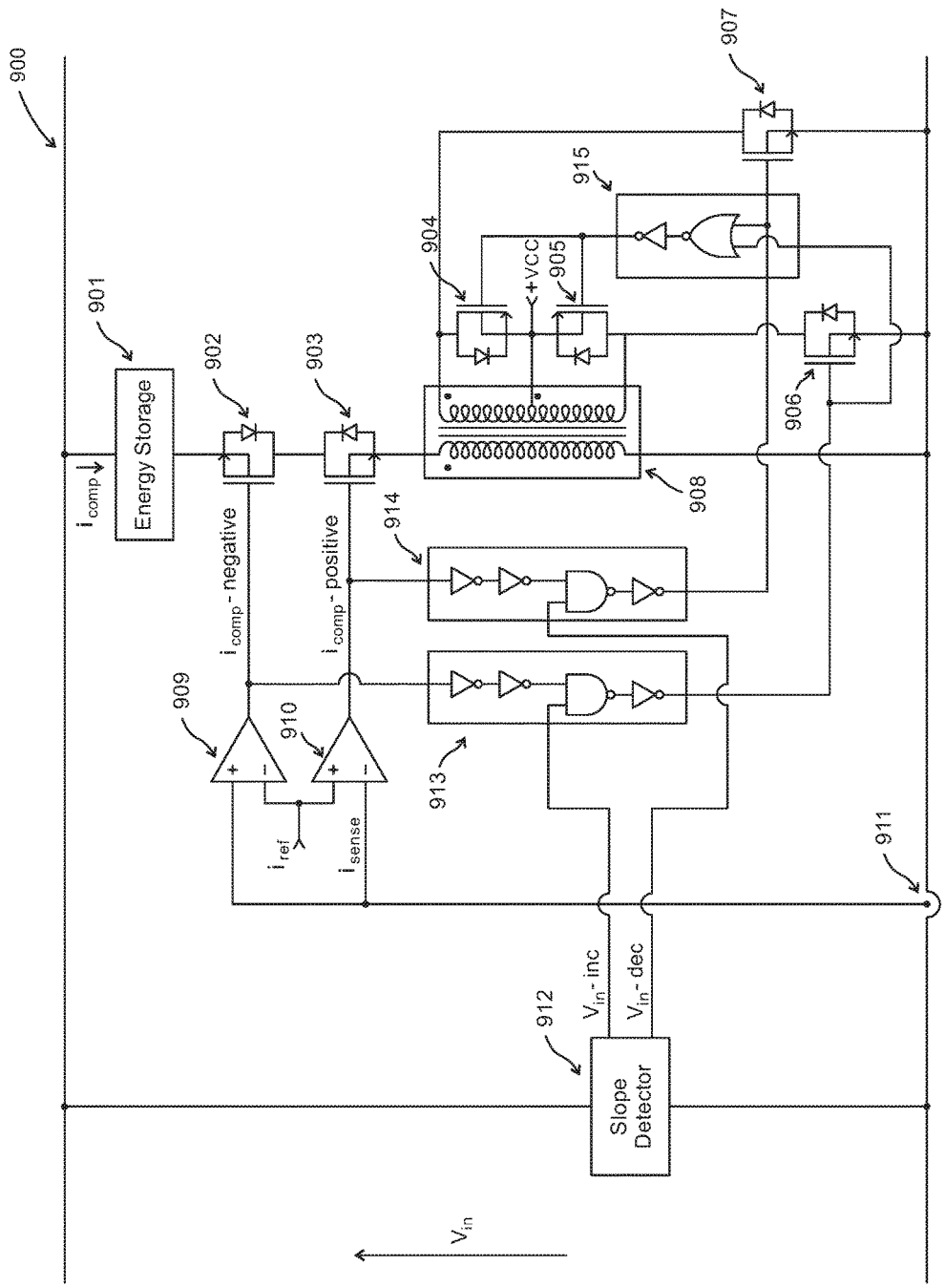
FIG. 9 is a circuit diagram of an auxiliary converter circuit in another embodiment of the invention.

FIG. 9 shows an auxiliary power converter 900 modified based on the circuit 800 in FIG. 8. In the circuit of FIG. 9, a negative supply voltage $-V_{cc}$ is eliminated (not used). The circuit 900 is particular suitable for use in switching converter circuits or applications in which an additional negative supply voltage is not readily available.

Circuit 900 includes an energy storage unit 901 (e.g., formed by a capacitor or capacitor network), a N-type MOSFET 902 with a body diode, a N-type MOSFET 903 with a body diode, and a transformer 908, arranged in series, and connected across the input of the switching converter circuit (not shown). The transformer 908 includes a secondary coil and primary coil portions. Each of the primary coil portions is connected in parallel with a respective P-type MOSFET 904, 905 (each with a body diode), with a positive supply voltage $+V_{cc}$ connected to a node between the two secondary coil portions. The circuit 900 also has a current sensor 911 for sensing an input current to the switching converter circuit (not shown) and the circuit 900. A comparator 909 is arranged between the current sensor 911 and the gate terminal of the N-type MOSFET 902. Another comparator 910 is arranged between the current sensor 911 and the gate terminal of the N-type MOSFET 903. Each of the comparators 909, 910 is arranged to compare the sensed input current $i_{sense}$ with a reference current $i_{ref}$ preferably the ideal input current $i_{ideal}$. A slope detector 912 is arranged to determine a change in the input voltage $v_{in}$, in particular whether the input voltage $v_{in}$ is increasing or decreasing, to control operation of the other parts of the circuit 900. A logic network 913 is connected, at its input, to a node between the comparator 909 and the gate terminal of the N-type MOSFET 902. The logic network 913 includes two inverters, a NAND gate, and another inverter connected in series. The two inverters are connected to one input of the NAND gate and output node of the slope detector 912 that indicates an increasing input voltage $v_{in}$ is connected to another input of the NAND gate. The output of the logic network 913 is connected to the gate terminal of N-type MOSFET 906 and the P-type MOSFETs 904, 905 through an N-type MOSFET 906 and also through another logic network 915 (formed by a NOR gate and a inverter connected in series). A logic network 914 is connected, at its input, to a node between the comparator 910 and the gate terminal of the N-type MOSFET 903. The logic network 914 includes two inverters, a NAND gate, and another inverter connected in series. The two inverters are connected to one input of the NAND gate and output node of the slope detector 912 that indicates a decreasing input voltage $v_{in}$ is connected to another input of the NAND gate. The output of the logic network 914 is connected to the gate terminal of N-type MOSFET 907 and the P-type MOSFETs 904, 905 through an N-type MOSFET 907 and also through the logic network 915. The logic network 915 takes the outputs of the logic networks 913, 914 as input, and outputs a signal to the gate terminals of the P-type MOSFETS 904, 905.

In the case of operation of the circuit 900 based on the operation of FIG. 6A, in which input voltage $v_{in}$ is increasing, the comparator 909 uses the reference (ideal) current $i_{ref}$ and the sensed input current $i_{sense}$ from current sensor 911 as inputs. Since the desired ideal current $i_{ref}$ is larger than the sensed input current $i_{sense}$, the output of the comparator 909 is zero, and this turns off the N-type MOSFET 902. Under such condition, only positive compensation current $i_{comp}$ can flow through the body diode of N-type MOSFET 902. The output of comparator 909 also turns off N-type MOSFET 906 by providing a zero to its gate terminal via the logic network 913. Since input voltage $v_{in}$ is increasing, outputs of the slope detector 912, at the node for input voltage $v_{in\_inc}$ and the node for input voltage $v_{in\_dec}$ are 1 and 0 respectively. The node for input voltage $v_{in\_dec}$ then turns off the N-type MOSFET 907, by providing a zero to the gate terminal of N-type MOSFET 907 via the logic network 914. Since both input signals of logic network 915 are zero (gate terminals of N-type MOSFET 906 and 907 are zero), the output of the logic network 915 is zero and thus both P-type MOSFET 904 and 905 are turned on, which effectively short-circuits the two transformer coils of transformer 908 across the drain and source terminals these P-type MOSFET 904 and 905. Such short circuiting is coupled to the third transformer coil of transformer 908, and hence effectively connecting the source terminal of N-type MOSFET 903 to the return side of the input voltage $v_{in}$. Comparator 910 uses the reference (ideal) current $i_{ref}$ and the sensed input current $i_{sense}$ from current sensor 911 as inputs. Since the reference (ideal) current $i_{ref}$ is larger than the sensed input current $i_{sense}$, output of comparator 910 is positive and is connected to the gate terminal of N-type MOSFET 903, which in turn controls the magnitude of the positive compensation current $i_{comp}$ to the desired value.

In the case of operation of the circuit 900 based on the operation of FIG. 6D, in which input voltage $v_{in}$ is decreasing, the comparator 910 uses the reference (ideal) current $i_{ref}$ and the sensed input current $i_{sense}$ from current sensor 911 as inputs. Since the reference (ideal) current $i_{ref}$ is smaller than the sensed input current $i_{sense}$, output of comparator 909 is zero which turn off N-type MOSFET 903. Under such condition, only negative compensation current $i_{comp}$ can flow through the body diode of N-type MOSFET 903. Output of comparator 910 also turns off N-type MOSFET 907 by providing a zero to its gate terminal via the logic network 914. Since input voltage $v_{in}$ is decreasing, outputs of the slope detector 912, at the node for input voltage $v_{in\_inc}$ and the node for input voltage $v_{in\_dec}$ are 0 and 1 respectively. The node for the input voltage $v_{in\_inc}$ then turns off N-type MOSFET 906, by providing a zero to the gate terminal of N-type MOSFET 906 via the logic network 913. Since both input signals of logic network 915 are zero (gate terminals of N-type MOSFET 906 and 907 are zero), the output of the logic network 915 is zero and thus both P-type MOSFET 904, 905 are turned on. This effectively short-circuits the two transformer coils of transformer 908 across the drain and source terminals these P-type MOSFET 904 and 905. Such short circuiting is coupled to the third transformer coil of transformer 908, and hence effectively connecting the source terminal of N-type MOSFET 903 to the return side of the input voltage $v_{in}$. Comparator 909 uses the reference (ideal) current $i_{ref}$ and the sensed input current $i_{sense}$ from current sensor 911 as inputs. Since the reference (ideal) current $i_{ref}$ is smaller than the sensed input current $i_{sense}$, output of comparator 909 is positive and is connected to the gate terminal of N-type MOSFET 902, which in turn controls the magnitude of the negative compensation current $i_{comp}$ to the desired value.

In the case of operation of the circuit 900 based on the operation of FIG. 6B, in which input voltage $v_{in}$ is increasing, comparator 910 uses the reference (ideal) current $i_{ref}$ and the sensed input current $i_{sense}$ from current sensor 911 as inputs. Since the reference (ideal) current $i_{ref}$ is smaller than the sensed input current $i_{sense}$, output of comparator 910 is zero, and the N-type MOSFET 903 is turned off. Under such condition, only negative compensation current $i_{comp}$ can flow through the body diode of N-type MOSFET 903. Output of comparator 910 also turns off N-type MOSFET 907 by providing a zero to its gate terminal via the logic network 914. Since the input voltage $v_{in}$ is increasing, outputs of the slope detector 912, at the node for input voltage $v_{in\_inc}$ and the node for input voltage $v_{in\_dec}$ are 1 and 0 respectively. Comparator 909 uses the reference (ideal) current $i_{ref}$ and the sensed input current $i_{sense}$ from current sensor 911 as inputs. Since the reference (ideal) current $i_{ref}$ is smaller than the sensed input current $i_{sense}$, output of comparator 909 is positive and is connected to the gate terminal of N-type MOSFET 902, which in turn controls the magnitude of the negative compensation current $i_{comp}$ to the desired value. In order to have the desired negative compensation current $i_{comp}$, an appropriate positive voltage across the transformer coil connecting between the source terminal of N-type MOSFET 903 and the return of input voltage $v_{in}$ is required. Since both the output of comparator 909 and the node for the input voltage $v_{in\_inc}$ are positive, output of logic network 913 is 1, and which is connected to the gate of N-type MOSFET 906. The turns on N-type MOSFET 906 and hence brings both the drain terminals of N-type MOSFET 906 and P-type MOSFET 905 to the potential of input voltage $v_{in}$ return line. The output of logic network 913 turns off both P-type MOSFET 904 and 905 via the logic network 915. Hence, a positive $V_{cc}$ will appear between the source and drain terminal of P-type MOSFET 905, and also the transformer coil of transformer 908 connected across these two circuit nodes. This in turn couples to another transformer coil across the source terminal of N-type MOSFET 903 and the input voltage $v_{in}$ return, to provide the required voltage for achieving negative compensation current $i_{comp}$.

In the case of operation of the circuit 900 based on the operation of FIG. 6C, in which input voltage $v_{in}$ is decreasing, comparator 909 uses the reference (ideal) current $i_{ref}$ and the sensed input current $i_{sense}$ from current sensor 911 as inputs. Since the desired ideal current $i_{ref}$ is larger than the sensed input current $i_{sense}$, output of comparator 909 is zero which turn off N-type MOSFET 902. Under such condition, only positive compensation current $i_{comp}$ can flow through the body diode of N-type MOSFET 902. Output of comparator 909 also turns off N-type MOSFET 906 by providing a zero to its gate terminal via the logic network 913. Since input voltage $v_{in}$ is decreasing, outputs of the slope detector 912, at the node for input voltage $v_{in\_inc}$ and the node for input voltage $v_{in\_dec}$ are 0 and 1 respectively. Comparator 910 uses the reference (ideal) current $i_{ref}$ and the sensed input current $i_{sense}$ from current sensor 911 as inputs. Since the reference (ideal) current $i_{ref}$ is larger than the sensed input current $i_{sense}$, output of comparator 910 is positive and is connected to the gate terminal of N-type MOSFET 903, which in turn controls the magnitude of the positive compensation current $i_{comp}$ to the desired value. In order to have the desired positive compensation current $i_{comp}$, an appropriate negative voltage across the transformer coil connecting between the source terminal of N-type MOSFET 903 and the return of input voltage $v_{in}$ is required. Since both the output of comparator 910 and input voltage $v_{in\_dec}$ are positive, output of logic network 914 is 1, and which is connected to the gate of N-type MOSFET 907. The turns on N-type MOSFET 907 and hence makes both the drain terminals of N-type MOSFET 907 and P-type MOSFET 904 to the potential of input voltage $v_{in}$ return line. The output of logic network 913 also turns off both P-type MOSFET 904 and 905 via the logic network 915. Hence, a positive $V_{cc}$ appears between the source and drain terminal of P-type MOSFET 904, and also the transformer coil of transformer 908 connected across these two circuit nodes. This in turn couples to another transformer coil across the source terminal of N-type MOSFET 903 and the input voltage $v_{in}$ return, to provide the required voltage for achieving positive compensation current $i_{comp}$.

Figure 10:
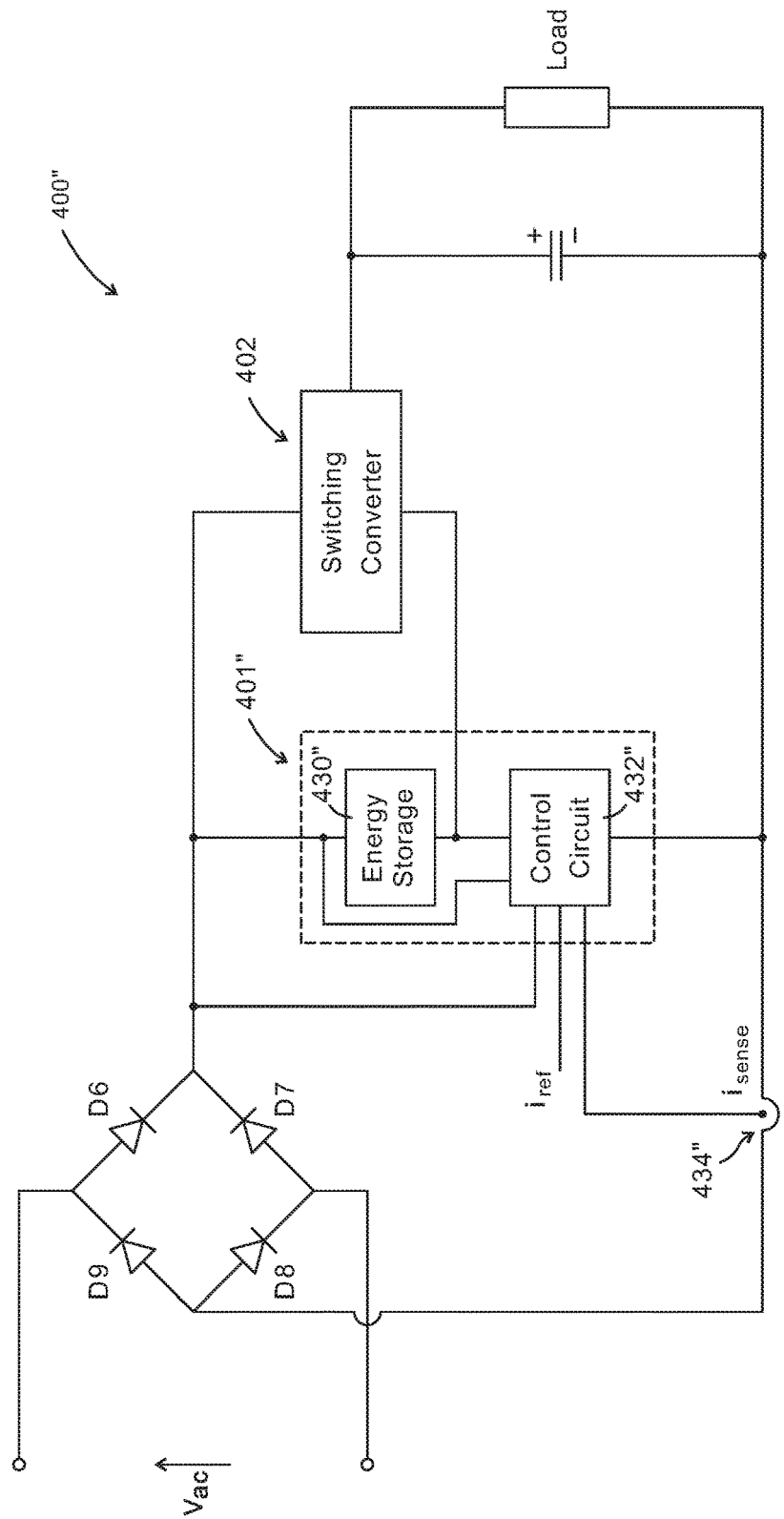
FIG. 10 is a block diagram of a circuit incorporating the auxiliary converter circuit of FIG. 4A, illustrating the basic construction of the auxiliary converter circuit of FIG. 4A in another embodiment of the invention.

FIG. 10 shows an alternative embodiment of an auxiliary converter circuit 401" based on the auxiliary converter circuit 401 in FIG. 4A. The main difference between circuit 401" in this embodiment and the circuit 401' in FIG. 4B is that in this circuit 401" embodiment, the return node of the main switching converter circuit 402 is connected to the circuit node between energy storage unit 430" and control circuit 432" of the auxiliary converter circuit 401".

It will be appreciated by persons skilled in the art that numerous variations and/or modifications may be made to the invention as shown in the specific embodiments without departing from the spirit or scope of the invention as broadly described. Also, the expressions "positive compensation current" and "negative compensation current" refer to current that flow in opposite direction. "Positive" and "negative" depends on the conventions or references taken in the circuit. The described embodiments of the invention should therefore be considered in all respects as illustrative, not restrictive.

Although all illustrations and descriptions above are made with reference to a boost converter or boost converter circuit operated with continuous mode (CM) and AC input, some embodiments of the invention are applicable to a different type of switching converter such as buck converter, buck-boost converter, flyback converter etc., and to a different switching control mode such as critical continuous mode (CCM), discontinuous mode (DCM), etc. Furthermore, the input power can be DC instead of AC. While the above circuit embodiments use MOSFETs as power switching devices for controlling current, in other embodiments, other types of transistors such as BJT, IGBT, thyristors, etc., may also or alternatively be used as the power switching devices.

The invention claimed is:

1. An auxiliary converter circuit for regulating an input current to a main switching converter circuit, comprising:
    a voltage detector for determining a change in a voltage across the auxiliary converter circuit;
    a current sensor for sensing an input current to the main switching converter circuit; and
    a current compensation circuit having
        a comparator circuit arranged to compare the input current sensed by the current sensor to a reference current, and
        a controlled current circuit arranged to selectively provide a positive compensation current and a negative compensation current to the input current, based on the change in the voltage determined by the voltage detector and comparison of the input current to the reference current, for suppressing harmonic distortion and electromagnetic interference in the input current.

2. The auxiliary converter circuit of claim 1, wherein
    the input current is input from a power source to the main switching converter circuit and to the auxiliary converter circuit, and
    the current sensor is arranged for sensing the input current.

3. The auxiliary converter circuit of claim 1, wherein the controlled current circuit is arranged to provide a positive compensation current when the voltage change determined by the voltage detector is an increase and the input current sensed by the current sensor is less than the reference current so as to reduce a difference between the input current sensed by the current sensor and the reference current.

4. The auxiliary converter circuit of claim 1, wherein the controlled current circuit is arranged to provide a positive compensation current when the voltage change determined by the voltage detector is a decrease and the input current sensed by the current sensor is less than the reference current so as to reduce a difference between the input current sensed by the current sensor and the reference current.

5. The auxiliary converter circuit of claim 1, wherein the controlled current circuit is arranged to provide a negative compensation current when the voltage change determined by the voltage detector is an increase and the input current sensed by the current sensor is larger than the reference current so as to reduce a difference between the input current sensed by the current sensor and the reference current.

6. The auxiliary converter circuit of claim 1, wherein the controlled current circuit is arranged to provide a negative compensation current when the voltage change determined by the voltage detector is a decrease and the input current sensed by the current sensor is larger than the reference current so as to reduce a difference between the input current sensed by the current sensor and the reference current.

7. The auxiliary converter circuit of claim 1, wherein the current compensation circuit further includes an energy storage unit arranged to
    store energy when the controlled current circuit provides a negative compensation current, and
    supply or transfer energy when the controlled current circuit provides a positive compensation current.

8. The auxiliary converter circuit of claim 7, wherein the energy storage unit comprises a capacitor.

9. The auxiliary converter circuit of claim 1, wherein the controlled current circuit further includes:
a controlled current source with at least one power switching device; and
at least switching unit, wherein
each switching unit is operably connected with the controlled current source for controlling a corresponding one of the power switching devices, and
each switching is respectively controlled, based on the change in the voltage determined by the voltage detector, to control a current provided by the controlled current source.

10. The auxiliary converter circuit of claim 9, wherein the switching unit comprises a multiplexer.

11. The auxiliary converter circuit of claim 9, wherein each of the power switching devices comprises a semiconductor switch.

12. The auxiliary converter circuit of claim 9, wherein the controlled current source is operably connected with a positive supply voltage and the switching units selectively connect and disconnect the controlled current source with the positive supply voltage for selectively providing the positive compensation current and the negative compensation current.

13. The auxiliary converter circuit of claim 9, wherein the controlled current source is operably connected with a negative supply voltage or ground, and the switching units selectively connect and disconnect the controlled current source with the negative supply voltage or ground for selectively providing the positive compensation current and the negative compensation current.

14. A circuit comprising:
a main switching converter circuit; and
an auxiliary converter circuit, arranged at an input of the main switching converter circuit, for regulating an input current to the main switching converter circuit, wherein the auxiliary converter circuit regulates the input current to the main switching converter circuit and comprises:
a voltage detector for determining a change in a voltage across the auxiliary converter circuit,
a current sensor for sensing an input current to the main switching converter circuit, and
a current compensation circuit having
a comparator circuit arranged to compare the input current sensed by the current sensor to a reference current, and
a controlled current circuit arranged to selectively provide a positive compensation current and a negative compensation current to the input current, based on the change in the voltage determined by the voltage detector and comparison of the input current to the reference current, for suppressing harmonic distortion and electromagnetic interference in the input current.

15. The circuit of claim 14, further comprising a rectifier circuit arranged to provide a rectified current to the main switching converter circuit.

16. The circuit of claim 15, wherein the rectifier circuit comprises a diode bridge.

17. The circuit of claim 14, wherein the main switching converter circuit comprises one of a boost converter, a buck converter, a buck-boost converter, and a flyback converter.

18. A method for regulating an input current input to a main switching converter circuit, the method comprising:
determining, using a voltage detector, a change in a voltage across the auxiliary converter circuit;
sensing, using a current sensor, an input current to the main switching converter circuit;
comparing, using a comparator circuit, the input current sensed to a reference current; and
selectively providing, using a controlled current circuit, a positive compensation current and a negative compensation current to the input current, based on the change in the voltage determined and the comparing of the input current sensed to the reference current, for suppressing harmonic distortion and electromagnetic interference in the input current.

19. The method of claim 18, further comprising providing, using the controlled current circuit, a positive compensation current,
when the change in the voltage is determined to be an increase and the input current sensed is less than the reference current, and
when the change in the voltage is determined to be a decrease and, the input current sensed is less than the reference current, so as to reduce a difference between the sensed input current and the reference current.

20. The method of claim 18, further comprising providing, using the controlled current circuit, a negative compensation current,
when the change in the voltage is determined to be a decrease and the input current sensed is larger than the reference current, and,
when the change in the voltage is determined to be an increase and the input current sensed is larger than the reference current, so as to reduce a difference between the sensed input current and the reference current.

* * * * *